(12) United States Patent
Hall et al.

(10) Patent No.: US 10,708,328 B2
(45) Date of Patent: Jul. 7, 2020

(54) HARDWARE ASSISTED MEDIA PLAYBACK AND CAPTURE SYNCHRONIZATION

(71) Applicant: INTEL CORPORATION, Santa Clara, CA (US)

(72) Inventors: Christopher Hall, Portland, OR (US); Kevin B. Stanton, Hillsboro, OR (US); Pierre-Louis Bossart, Austin, TX (US); Anthony S. Bock, Vancouver, WA (US); Ohad Falik, Ha (IL)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 14/215,940

(22) Filed: Mar. 17, 2014

(65) Prior Publication Data

US 2015/0264136 A1 Sep. 17, 2015

(51) Int. Cl.
*H04L 29/08* (2006.01)
*H04L 29/06* (2006.01)

(52) U.S. Cl.
CPC ............ *H04L 65/60* (2013.01); *H04L 65/604* (2013.01); *H04L 65/607* (2013.01); *H04L 67/2842* (2013.01)

(58) Field of Classification Search
CPC ............................ H04L 67/1095; H04L 65/60
USPC ........................................................ 709/248
See application file for complete search history.

(56) References Cited

U.S. PATENT DOCUMENTS

| 5,661,665 A | * | 8/1997 | Glass | H04N 21/242 348/390.1 |
| 5,815,689 A | * | 9/1998 | Shaw | G06F 17/30017 707/E17.009 |
| 6,119,213 A | * | 9/2000 | Robbins | H04N 21/4305 375/E7.094 |
| 6,233,389 B1 | * | 5/2001 | Barton | G11B 27/002 348/E5.007 |
| 6,594,773 B1 | * | 7/2003 | Lisitsa | H04N 21/4143 375/E7.271 |
| 6,801,544 B1 | * | 10/2004 | Rijckaert | G11B 27/3027 348/512 |
| 7,039,048 B1 | * | 5/2006 | Monta | H04L 12/2801 370/389 |
| 9,521,178 B1 | * | 12/2016 | Gigliotti | H04L 65/602 |
| 2002/0052967 A1 | * | 5/2002 | Goldhor | G10L 21/04 709/231 |
| 2002/0099458 A1 | * | 7/2002 | Rudolph | H04H 60/04 700/94 |
| 2005/0102306 A1 | * | 5/2005 | Miller | G11B 27/34 |

(Continued)

FOREIGN PATENT DOCUMENTS

CN 102047592 A 5/2011

*Primary Examiner* — Abdullahi E Salad
(74) *Attorney, Agent, or Firm* — Finch & Maloney PLLC

(57) ABSTRACT

Techniques to output a media stream, capture a media stream, or synchronize the output or capture of the media stream at a specified time are described. A media stream output or capture apparatus may include a media processor to receive a media stream to output or a request to capture a media stream and a start time. A buffer generator may be included to generate an input or an output buffer and a media mixer may be included to mix the media stream into the output buffer at the start time or capture the media stream from the input buffer at the start time.

10 Claims, 8 Drawing Sheets

(56) References Cited

U.S. PATENT DOCUMENTS

| Publication No. | Date | Inventor | Classification | Subclass |
|---|---|---|---|---|
| 2005/0146448 A1* | 7/2005 | Evans | H04N 21/2368 | 341/50 |
| 2006/0146884 A1* | 7/2006 | Skerritt | H04J 3/0658 | 370/503 |
| 2006/0156217 A1* | 7/2006 | Ertel | H04N 5/04 | 715/202 |
| 2007/0143800 A1* | 6/2007 | Salomons | H04N 7/163 | 725/74 |
| 2008/0034276 A1* | 2/2008 | Ficco | G06Q 30/02 | 715/201 |
| 2008/0147213 A1* | 6/2008 | Omiya | G06F 3/162 | 700/94 |
| 2009/0088880 A1* | 4/2009 | Thapa | H04N 7/15 | 700/94 |
| 2009/0222873 A1* | 9/2009 | Einarsson | H04N 21/23406 | 725/115 |
| 2009/0249222 A1* | 10/2009 | Schmidt | H04N 21/2368 | 715/751 |
| 2010/0008385 A1* | 1/2010 | Noronha, Jr. | H04N 21/2389 | 370/545 |
| 2010/0039962 A1* | 2/2010 | Varesio | H04M 3/56 | 370/260 |
| 2010/0153578 A1* | 6/2010 | Van Gassel | H04L 65/607 | 709/231 |
| 2010/0254673 A1* | 10/2010 | Begen | H04N 7/17318 | 386/239 |
| 2011/0216785 A1* | 9/2011 | Begen | H04J 3/18 | 370/477 |
| 2011/0217025 A1* | 9/2011 | Begen | H04N 5/931 | 386/338 |
| 2011/0280307 A1* | 11/2011 | MacInnis | G06T 9/00 | 375/240.15 |
| 2011/0286472 A1* | 11/2011 | Williams | H04J 3/0632 | 370/474 |
| 2012/0069137 A1* | 3/2012 | Thapa | H04N 7/15 | 348/14.08 |
| 2012/0300960 A1* | 11/2012 | Mackay | H04H 60/04 | 381/119 |
| 2013/0003993 A1* | 1/2013 | Michalski | H04H 20/74 | 381/119 |
| 2013/0044801 A1* | 2/2013 | Cote | H04N 19/146 | 375/240.01 |
| 2014/0013008 A1* | 1/2014 | Lazarus | H04L 29/06993 | 709/248 |
| 2014/0112385 A1* | 4/2014 | Van Veldhuisen | H04N 21/2365 | 375/240.02 |
| 2014/0112386 A1* | 4/2014 | Van Veldhuisen | H04N 21/23655 | 375/240.02 |
| 2014/0130110 A1* | 5/2014 | Gilson | H04N 21/4302 | 725/89 |
| 2014/0173432 A1* | 6/2014 | Millington | H04J 3/0664 | 715/716 |
| 2015/0039109 A1* | 2/2015 | Millington | H04J 3/0664 | 700/94 |
| 2015/0063774 A1* | 3/2015 | Brown, Jr. | G11B 27/19 | 386/203 |
| 2015/0081851 A1* | 3/2015 | Oyman | H04W 74/0833 | 709/219 |

\* cited by examiner

HARDWARE ASSISTED MEDIA PLAYBACK AND CAPTURE SYNCHRONIZATION

BACKGROUND

Modern computing devices typically include the ability to output and/or capture a media stream. For example, computing devices are often configured to output audio and/or video. Additionally, computing devices are often configured to capture audio and/or video. Conventionally, computing devices have been configured to output and/or capture media "on demand." That is, a computing device may receive a prompt to output a media stream or to capture of a media stream. Subsequently, the computing device will initiate the output or the capture at a first opportunity.

As will be appreciated, the number of computing devices in use has rapidly increased. In many cases, multiple computing devices may be concurrently used by a single person or within a single location. For example, a home may have a variety of computing devices (e.g., computer, tablet, smart phone, television, content streaming device, wireless speakers, wireless displays, or the like) in use at any given time. Additionally, a single computing device may be equipped with multiple input and output components (e.g., speakers, displays, microphones, cameras, or the like).

As noted, however, computing platforms are generally configured to only output media streams or capture media streams at a first opportunity. Accordingly, computing platforms cannot synchronize the output or capture of media streams across multiple input and output devices or across multiple computing devices. One solution to coordinating the output or capture of media streams has been to provide a single dedicated hardware component that has exclusive access to the input and output devices in order to manage the synchronization. This can be problematic, however, and is impractical for synchronizing the output or capture of media stream across multiple devices that are not suited for exclusive control by the dedicated hardware component.

It is with respect to the above, that the present disclosure is provided.

DETAILED DESCRIPTION

Figure 1:
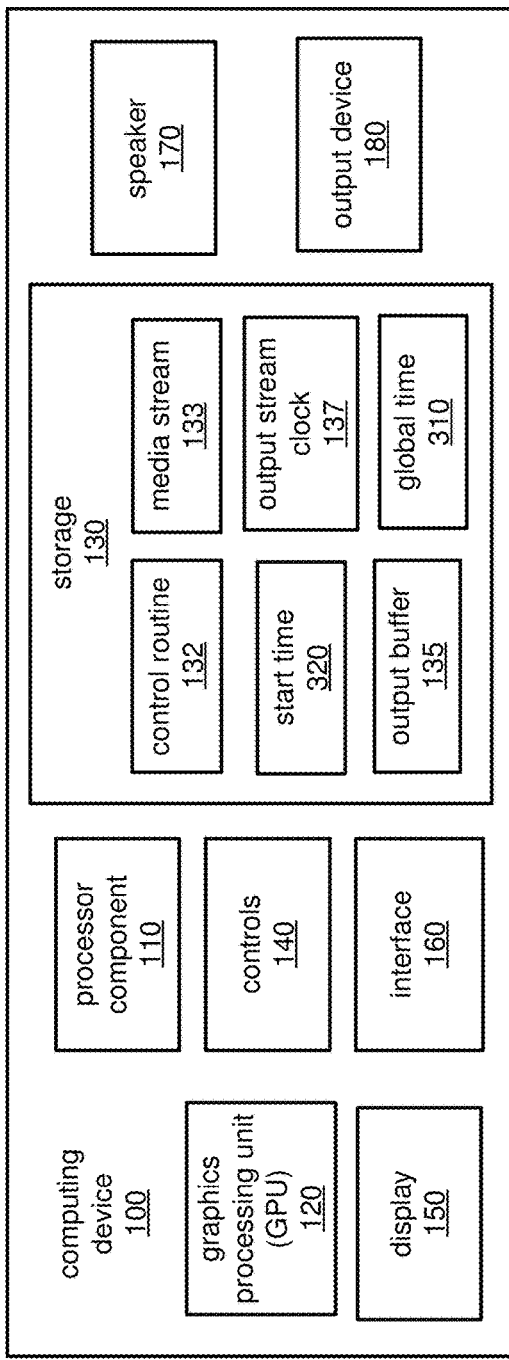
FIG. 1 illustrates an embodiment of a media stream synchronization system.
Figure 1:
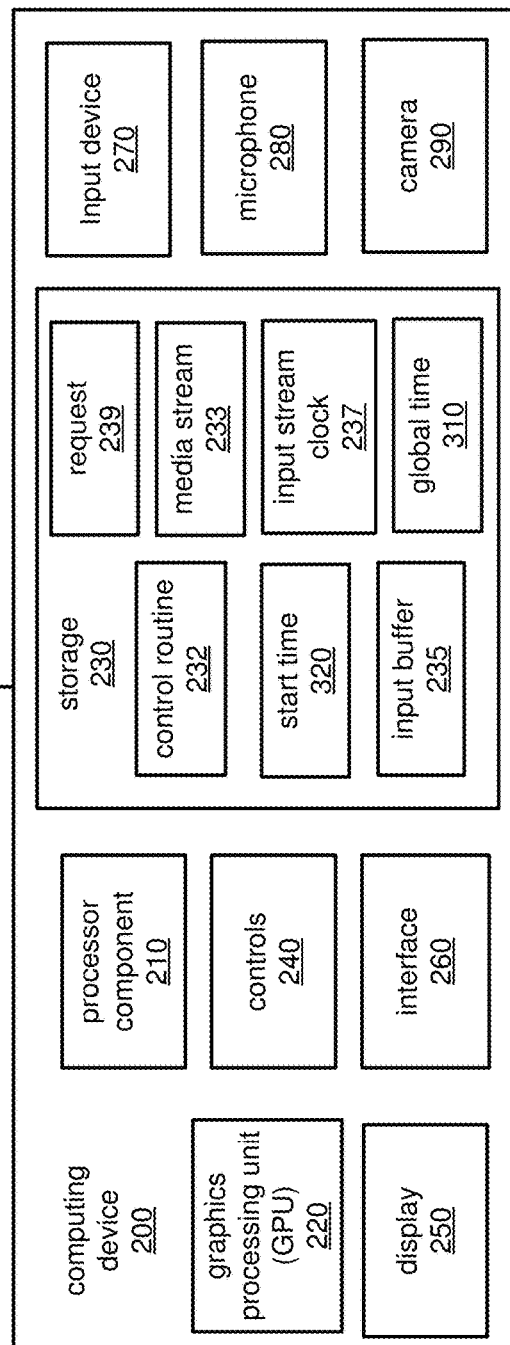

Various embodiments are generally directed to techniques to coordinate the output and/or capture of a media stream in time. In some examples, the output and/or capture of a media stream may be synchronized across multiple input devices, output devices, and/or multiple computing devices. Said differently, various embodiments of the present disclosure may be provided to cause a media stream to be output and/or captured at a precise time. In general, the media stream may be output and/or captured at a precise time in the future. In some examples, the present disclosure provides that a media stream may be output and/or captured where the outputting and/or capturing is synchronized in time across multiple devices.

With some examples, the synchronization may be across multiple computing devices. For example, output of an audio media stream from speakers of multiple different computing devices may be synchronized in time. With some examples, the synchronization may be across multiple input and/or output devices from a single computing device. For example, output of an audio media stream from speakers within a single computing device may be synchronized in time. Furthermore, the output may be coordinated to occur in the future. As another example, the output of a media stream may be coordinated with the capture of a media stream (e.g., from a speaker and a microphone, or the like.) These and other example will be more fully described hereafter.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a media stream synchronization system 1000 incorporating a computing device 100 and a computing device 200. In general, the computing device 100 is depicted configured to output a media stream at a specified time and/or to synchronize the output in time with another device (e.g., the device 200). The computing device 200 is depicted configured to capture a media stream at a specified time and/or to synchronize the capture in time with another device (e.g., the device 100). It is important to emphasize, however, that this is not intended to be limiting and the computing device 100 may be configured to capture a media stream while the computing device 200 may be configured to output a media stream. Additionally, although only the computing device 100 and 200 are depicted, the system 1000 may include any number of devices, which may be configured to synchronize the output or capture of media streams in time with one or more other devices in the system 1000. Furthermore, it is important to note, that although the computing devices 100 and 200 are depicted as separate devices, they may, in some embodiments, be incorporated into a single device. Furthermore, multiple computing devices may be implemented to embody each of the computing devices 100 and/or 200. Additionally, it is important to note, that although various examples herein discuss synchronizing the output of a media stream with the capture of a media stream, this is not intended to be limiting. More specifically, various embodiments may provide for synchronizing the output of one or more media streams across multiple output devices. Similarly, various embodiments may provide for synchronizing the capture of one or more media streams across multiple input devices. For example, multiple input devices may be deployed and the capture of a media stream coordinated in time to produce a multi-track media stream where the various tracks are phase-aligned.

It is important to note, that although the present disclosure (e.g., FIGS. 1-3) depict simple examples involving a few devices (e.g., the computing device 100 and/or the computing device 200) and a few media streams (e.g., the media stream 133 and/or the media stream 233), the present disclosure is applicable to multiple media streams and multiple devices. In some examples, the media streams may have multiple channels. As such, various devices may be configured to output and/or capture one or more of these channels. As a particularly illustrative example, a first device may be configured to output a first channel of a media stream, a second device may be configured to output a second channel of the same media stream, and a third device may be configured to output both channels of the same media stream, wherein the output by each device is coordinated in time and/or synchronized as detailed herein.

The computing devices 100 and/or 200 may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing or wearable accessories (e.g., glasses, a watch, etc.,) a computing device integrated into a vehicle (e.g., a car, a bicycle, a wheelchair, etc.), a server, a cluster of servers, a server farm, a station, a wireless station, user equipment, and so forth. Furthermore, the computing devices 100 and/or 200 may be any of a variety of types of display devices not traditionally thought of as "computers," including without limitation, a DVD player, a portable video player, a console video game system, a television receiver, a video content streaming device, and so forth. Embodiments are not limited in this context.

As depicted, the computing devices 100 and 200 may exchange signals conveying media stream information (e.g., input or output content, start time, global time, or the like) through network 999. Additionally, the computing devices 100 and/or 200 may exchange other data entirely unrelated to media stream information via the network 999. The computing devices 100 and/or 200 may exchange signals, including media stream information, with each other and with other computing devices (not shown) through network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Furthermore, although the network 999 is shown as a wireless network, it may in some examples be a wired network.

In various embodiments, the computing device 100 incorporates one or more of a processor component 110, a GPU 120, storage 130, controls 140, a display 150, an interface 160, a speaker 170, and an output device 180. In various embodiments, the output device 180 may be the display 150 and/or the speaker 170. The storage 130 stores one or more of a control routine 132, a media stream 133, a start time 320, an output stream clock 137, an output buffer 135, and a global time 310.

The interface 160 may be configured to couple the computing device 100 to the network 999. During operation, the computing device 100 may receive and/or transmit one or more of the media stream 133, the start time 320, the output stream clock 137, the output buffer 135, and the global time 310 through the network 999 via the interface 160.

In the computing device 100, the control routine 132 incorporates a sequence of instructions operative on the processor component 110 in its role as a main processor component to implement logic to perform various functions. In executing the control routine 132, the processor component 110 receives (e.g., via the network 999) the media stream 133. The media stream 133 may include an indication of the start time 320. In general, the start time 320 corresponds to the time at which the media stream 133 is to be output (e.g., rendered). With various examples, the start time 320 may be specified in terms of the output stream clock 137.

The output stream clock 137 may correspond to a local system time or the global time 310. For example, in applications where the output of the media stream 133 is coordinated within the computing device 100 (e.g., by multiple speakers, multiple displays, or the like) the output stream clock 137 may correspond to a local system time. In applications where the output of the media stream is coordinated across multiple devices (e.g., the computing device 100 and the computing device 200, or the like) the output stream clock 137 may correspond to the global time 310.

The global time 310 may be a time received through the network 999, such as, for example, without limitation, a time broadcast over a network, or the like.

The media stream 133 may be a variety of different types of media streams (e.g., audio, video, or the like) and may be output by one or more types of output devices. The processor component 110 may utilize one or more device drivers to cause the media stream 133 to be output by the appropriate output device. Furthermore, the media stream may be encoded using a variety of encoding standards and may comprise one or more samples having a period. For example, the media stream may be encoded using a particular frequency and may include one or more samples having a period corresponding to the frequency of encoding. The processor component 110 may utilize one or more decoding codecs to output the media stream 133 on the output device.

As used herein, a media stream (e.g., the media stream 133, the media stream 233, or the like) may be composed of multiple channels. For example, a media stream may include multiple channels encoded using various encoding standards (e.g., PCM, mp3, MPEG, or the like). Furthermore, some examples refer to media stream having a "period". It is to be appreciated, that these examples are not intended to be limiting, and some the present disclosure may be applied to media streams that do not have defined periods (e.g., PWM encoded media streams, DSD® encoded media stream, or the like). Furthermore, it is to be appreciated that the present disclosure is applicable to media streams in general, which may be encoded using a variety of different encoding standards. The example encoding standards provided herein are given for clarity of presentation, and not intended to be limiting.

In executing the control routine 132, the processor component 110 activates the output device 180 and records the time the output device 180 started. With some examples, the time the output device started is specified in terms of the output stream clock 137. Additionally, the processor component generates the output buffer 135 based on the start time 320 and the output stream clock 137.

With some examples, the processor component may generate the output buffer 135 to have a length based on the start time 320 and the output stream clock 137. Said differently, the output buffer 135 may be generated to have a length in time of at least the difference between the time the output device 180 started and the start time 320. It is important to note, that the length of the output buffer 135 may be determined based on the start time 320, the time the output device 180 started, the output stream clock 137, and the frequency with which the media stream 133 is encoded.

In general, the processor component 110 generates the output buffer 135 with no output. More specifically, the output buffer 135 is empty. As such, the output device 180, although active and processing the output buffer 135, has no output initially (e.g., until the start time 320 explained in greater detail below.) For example, if the media stream 133 is an audio media stream, the processor component 110 may generate the output buffer 135 with silent samples. As another example, if the media stream 133 is a video media stream, the processor component 110 may generate the output buffer 135 with blank samples.

In executing the control routine 132, the processor component 110 may mix the media stream 133 into the output buffer 135 associated with the start time 320. Said differently, the processor 132 mixes the media stream 133 into the output buffer 135 at the position associated with the desired start time 320 within the output stream clock 137. Accordingly, output of the media stream 133 on the output device 180 may be synchronized or scheduled to occur at a specific time. As such, the output may be coordinated with either the output of the media stream 133 (or another media stream) and/or the capture of another media stream.

In various embodiments, the computing device 200 incorporates one or more of a processor component 210, a GPU 220, storage 230, controls 240, a display 250, an interface 260, an input device 270, a microphone 280, a camera 290. It is important to note, that although not shown, the computing device 200 may also include other sensors and actuators. In various embodiments, the input device 270 may be the microphone 280 and/or the cameral 280. The storage 230 stores one or more of a control routine 232, a media stream 233, the start time 320, an input buffer 235, an input stream clock 237, a request 239, and the global time 310.

The interface 260 may be configured to couple the computing device 200 to the network 999. During operation, the computing device 200 may receive and/or transmit one or more of the media stream 233, the start time 320, the input stream clock 237, the input buffer 235, the request 239, and the global time 310 through the network 999 via the interface 260.

In the computing device 200, the control routine 232 incorporates a sequence of instructions operative on the processor component 210 in its role as a main processor component to implement logic to perform various functions. In executing the control routine 232, the processor component 210 receives (e.g., via the network 999) the request 239 to capture the media stream 233. The request 239 includes an indication of the start time 320. In general, the start time 320 corresponds to the time at which the media stream 233 is to be captured (e.g., recorded, or the like). With various examples, the start time 320 may be specified in terms of the input stream clock 237. It is important to note, that the start time 320 at which the computing device 100 outputs the media stream 133 and the start time 320 at which the computing device 200 capture the media stream 233 is denoted with the same reference number 320. This is done to illustrate that the times can be the same. As such, the output of the media stream 133 may be coordinated or synchronized with the capture of the media stream 233. Examples, however, are not limited in this context and the start times need not necessarily be the same.

The input stream clock 237 may correspond to a local system time or the global time 310. For example, in applications where the capture of the media stream 233 is coordinated within the computing device 200 (e.g., by multiple microphones, multiple cameras, or the like) the input stream clock 237 may correspond to a local system time. In applications where the capture of the media stream 233 is coordinated across multiple devices (e.g., the computing device 100 and the computing device 200, or the like) the input stream clock 237 may correspond to the global time 310.

The media stream 233 may be a variety of different types of media streams (e.g., audio, video, or the like) and may be captured by one or more types of input devices. The processor component 210 may utilize one or more device drivers to cause the media stream 233 to be captured from the appropriate input device. Furthermore, the media stream 233 may be encoded using a variety of encoding standards and may comprise one or more samples having a period. For example, the media stream 233 may be encoded using a particular frequency and may include one or more samples having a period corresponding to the frequency of encoding. The processor component 210 may utilize one or more encoding codecs to capture the media stream 233 from the input device 270.

In executing the control routine 232, the processor component 210 activates the input device 270 and records the time the input device 270 started. With some examples, the time the input device 270 started is specified in terms of the input stream clock 237. Additionally, the processor component 210 generates the input buffer 235 based on the start time 320 and the output stream clock 237. In general, the processor component 210 generates the input buffer 235 to store the input from the input device 270 prior to processing.

In executing the control routine 232, the processor component 210 may capture the media stream 233 from the input buffer 235 at the start time 320. Said differently, the processor 210 generates the media stream 233 from the input in the input buffer 235 when the start time 320 aligns with the input stream clock 237 and ignores the input from the time prior to the start time 320. Accordingly, capturing the media stream 233 from the input device 270 may be synchronized or scheduled to occur at a specific time. As such, the capture may be coordinated with either the output of the media stream 133 (or another media stream) and/or the capture of another media stream.

In various embodiments, the processor component 110 and/or the processor component 210 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the GPU 120 and/or the GPU 220 may include any of a wide variety of commercially available graphics processing units. Further, one or more of these graphics processing units may have dedicated memory, multiple-threaded processing and/or some other parallel processing capability.

In various embodiments, the storage 130 and/or the storage 230 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the controls 140 and/or the control 240 may include any of a variety of controls (e.g., hardware, software, hardware and software, or the like) for providing input or receiving output from the computing device 100.

In various embodiments, the display 150 and/or the display 250 may be based on any of a variety of displays (e.g., Plasma, LCD, LED, OLED, or the like) for displaying images.

In various embodiments, the interface 160 and/or the interface 260 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.11n, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1× RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
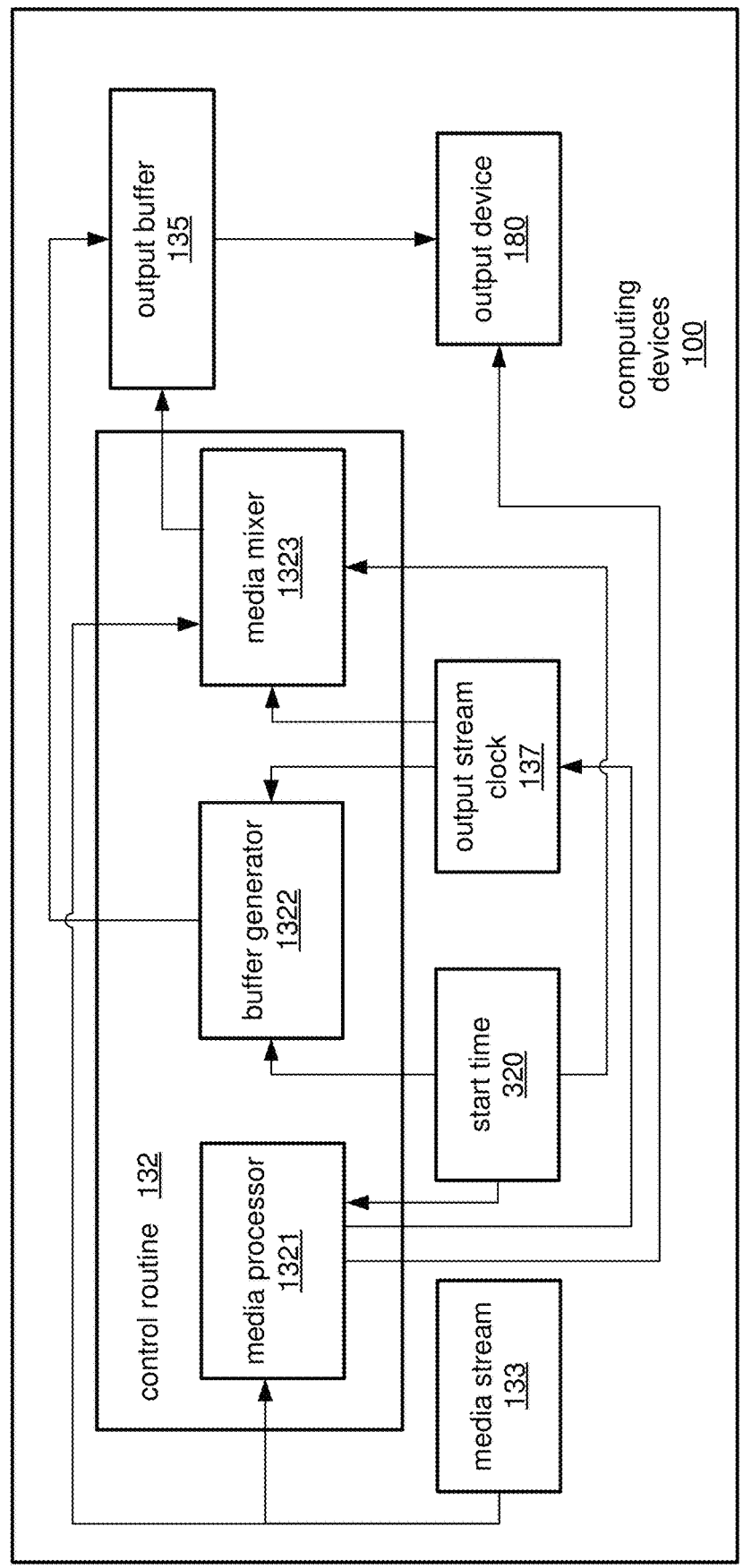
FIGS. 2-3 illustrate examples of portions of the media stream synchronization system of FIG. 1.
Figure 3:
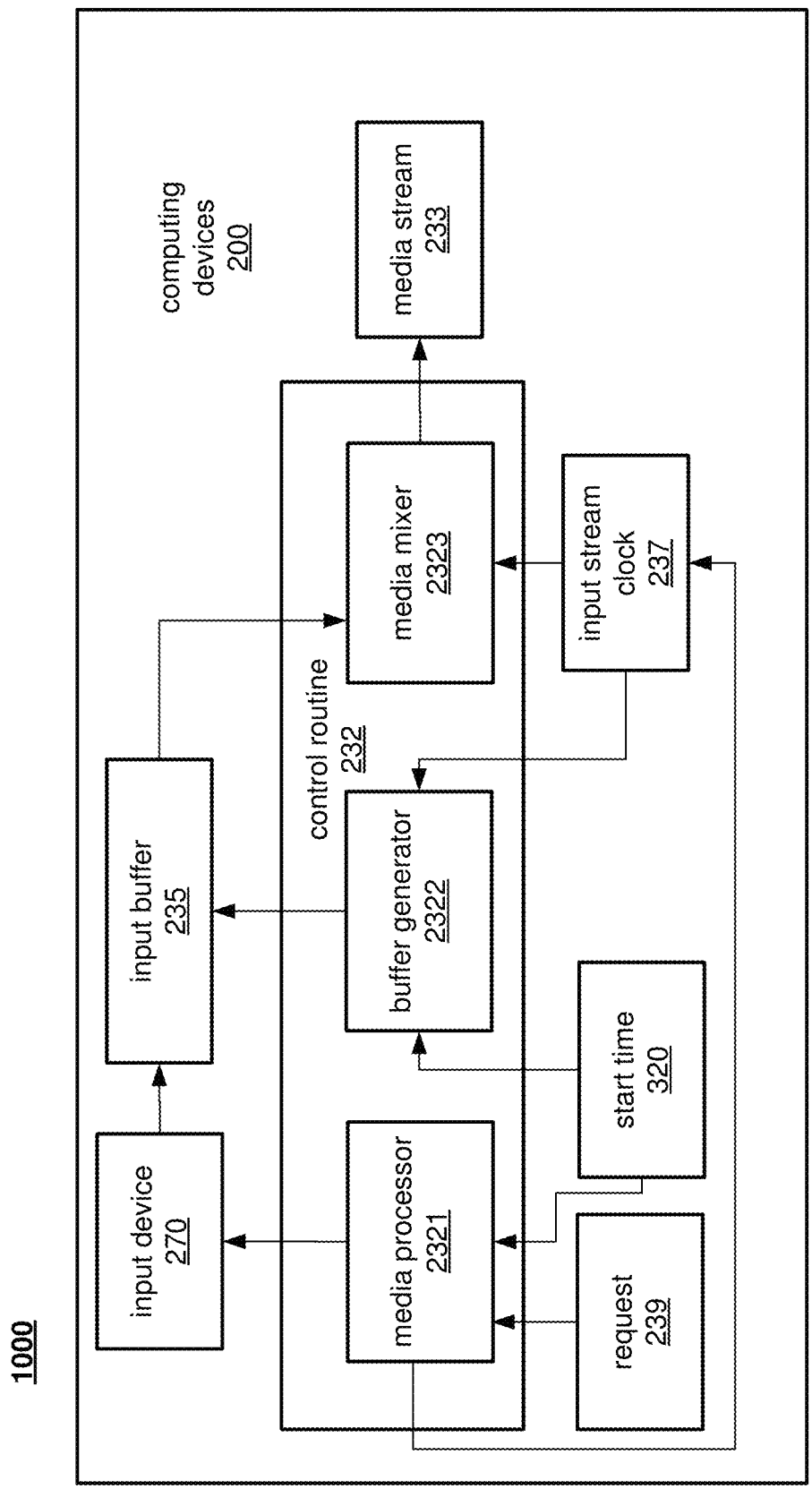

FIGS. 2-3 are block diagrams of portions of an embodiment of the media stream synchronization system 1000 of FIG. 1. In general, FIGS. 2-3 illustrate aspects of the operation of the system 1000. In particular, FIG. 2 illustrates an embodiment of the computing device 100 configured to output the media stream 133 at the start time 320 while FIG. 3 illustrates an embodiment of the computing device 200 configured to capture the media stream 233 at the start time 320.

In various embodiments, the control routine 132 and/or the control routine 232 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or 210. Where one or more device drivers are included, those device drivers may provide support for any of a variety of other components, whether hardware or software components, of the computer system 100 and/or 200.

Turning more specifically to FIG. 2, the control routine 132 includes a media processor 1321, a buffer generator 1322, and a media mixer 1323. In general, the control routine 132 receives the media stream 133 and the start time 320 and causes the media stream 133 to be output at the start time 320. It is to be appreciated, that the computing device 100 may receive the media stream 133 from a variety of sources (e.g., the storage 130, the computing device 200, another storage that is not shown, another computing device that is also not shown but that is connected to the computing device 100 over the network 999 or another network.)

The media processor 1321 receives the media stream 133 and the start time 320. The media stream may include the start time 320, or an indication of the start time 320 as part of the media stream. In some examples, the start time 320 may be in terms of the output stream clock 137. In general, the output stream clock 137 may have resolution (e.g., periods) of less than 1 microsecond. However, this is not limiting and is merely provided to show that the output stream clock 137 has resolution sufficient to coordinate and/or synchronize the output and capture of media streams.

The media processor 1321 determines whether the output device 180 is currently active. Additionally, the media processor activates the output device 180 based on the determination that the output device 180 is not active and records the time the output device 180 started in terms of the output stream clock 137. In some examples, the media processor 1321 determines that the output device 180 is active. As such, the media processor will not need to activate the output device 180.

The buffer generator 1322 generates the output buffer 135 for the output device 180 to process based on the start time 320 and an output stream clock 137. More specifically, the buffer generator 1322 generates an empty (e.g., silent, blank, or the like) stream for the output device 180. In some examples, the buffer generator 1322 generates the output buffer to have a particular length. The length may be specified in terms of the output stream clock 137 (e.g., time periods, or the like) or may be specified in terms of samples. More specifically, the media stream 133 may be comprised of a number of samples, with each sample having a specific period. These sample periods may correspond to the frequency with which the media stream 133 is encoded. Accordingly, the buffer generator 1322 may generate an output buffer having a length (e.g., in time, in periods, or the like) based on the difference (e.g., in time, in periods, or the like) between output stream clock 137 at the time the buffer generator 1322 generates the output stream (which may correspond to when the output device 180 was started) and the start time 320.

The media mixer 1323 mixes the media stream 133 into the output buffer 135 at the position corresponding to the start time 320. More specifically, while the output device 180 is active and processing the output buffer 135, the media mixer maintains the relationship between the output buffer 135 and the output stream clock 137. When the output stream clock 137 reaches the start time 320, the media mixer 1323 mixes the media stream 133 into the output buffer 135. As such, the output device 180 will output the media stream 133 at the start time 320.

As an example, once the media stream 133 is received, the media mixer 1323 repeatedly checks to see if the output buffer 135 and the output stream clock 137 are within a specified time (e.g., +/−one half of a time period, +/−one half of a sample period, or the like) to the start time 320. Once the media mixer 1323 determines that the output buffer 135 is within the specified time of the start time 320, the media mixer 1323 begins mixing the media stream 133 into the output buffer 135.

In some examples, a higher precision of alignment between the start time 320, the output stream clock 137, and/or output buffer 135 may be achieved by applying Micro Sample Rate Conversion (MSRC) to adjust the sub-sample-period phase. Various MSRC algorithms and/or technologies may be applied based on the desired precision for the sub-sample-period alignment.

Turning more specifically to FIG. 3, the control routine 232 includes a media processor 2321, a buffer generator 2322, and a media mixer 2323. In general, the control routine 232 receives the request 239 to capture the media stream 233 at the start time 320. It is to be appreciated, that the computing device 200 may receive the request 330 from a variety of sources (e.g., an application executing on the computing device 200, the computing device 100, another computing device that is not shown but that is connected to the computing device 200 over the network 999 or another network.) Furthermore, the computing device 200 may store and or communicate the captured media stream 233 to storage 230, another storage (not shown), the computing device 100, or another computing device (also not shown).

The media processor 2321 receives the request 239 to capture the media stream 233 and the start time 320. The start time 320 may be specified in terms of the input stream clock 237. In general, the input stream clock 237 may have resolution (e.g., periods) of less than 1 microsecond. However, this is not limiting and is merely provided to show that the input stream clock 237 has resolution sufficient to coordinate and/or synchronize the output and capture of media streams.

The media processor 2321 determines whether the input device 270 is currently active. Additionally, the media processor 2321 activates the input device 270 based on the determination that the input device 270 is not active and records the time the input device 270 started in terms of the input stream clock 237. In some examples, the media processor 2321 determines that the input device 270 is active. As such, the media processor 2321 will not need to activate the input device 270.

The buffer generator 2322 generates the input buffer 235 to store samples from the input device 270. In some examples, the input buffer 235 may be a temporary storage location allocated to store samples captured from the input device 270.

The media mixer 2323 captures the media stream 233 from the input buffer 235 at the start time 320. More specifically, while the input device 270 is active and samples are being stored in the input buffer 235, the media mixer 2323 maintains the relationship between the input buffer 235 and the input stream clock 237. When the input stream clock 237 aligns with the start time 320, the media mixer 2323 begins capturing the media stream 233 from the input buffer 235. Said differently, the media mixer 2323 ignores and/or discards the samples in the input buffer 235 that were recorded before the start time 320. As such, the media stream 233 may be captured from the input device 270 at the start time 320.

As an example, once the request 239 is received, the media mixer 2323 repeatedly checks to see if the input buffer 235 and the input stream clock 237 are within a specified time (e.g., +/−one half of a time period, +/−one half of a sample period, or the like) to the start time 320. Once the media mixer 2323 determines that the input buffer 235 is within the specified time of the start time 320, the media mixer 2323 generates the media stream 233 from the samples in the input buffer 235 that were stored after the start time 320.

In some examples, a higher precision of alignment between the start time 320 and the input stream clock 237 may be achieved by applying Micro Sample Rate Conversion (MSRC) to adjust the sub-sample-period phase. Various MSRC algorithms and/or technologies may be applied based on the desired precision for the sub-sample-period alignment.

Figure 4:
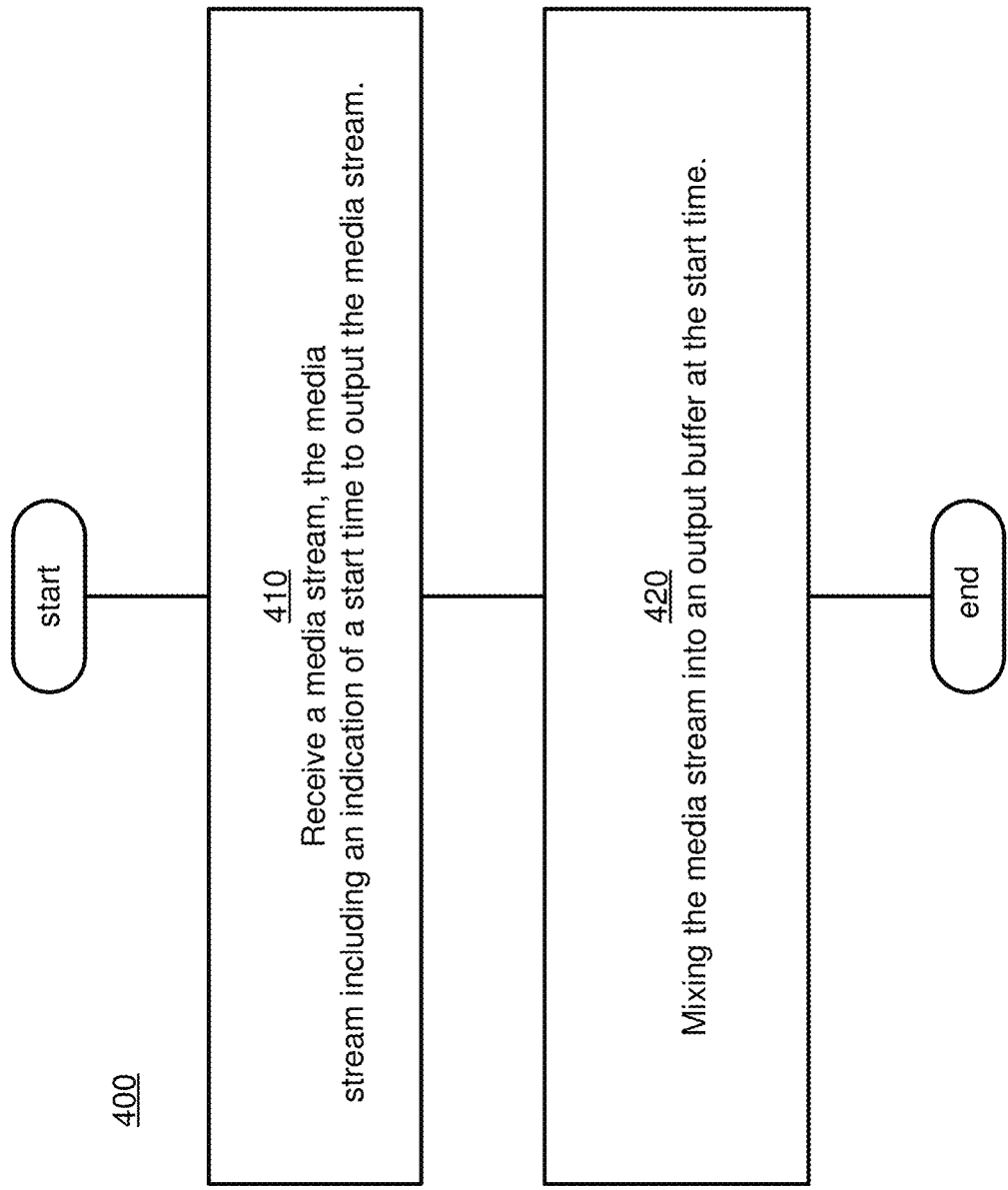
FIGS. 4-6 illustrate examples of logic flows according to embodiments.
Figure 5:
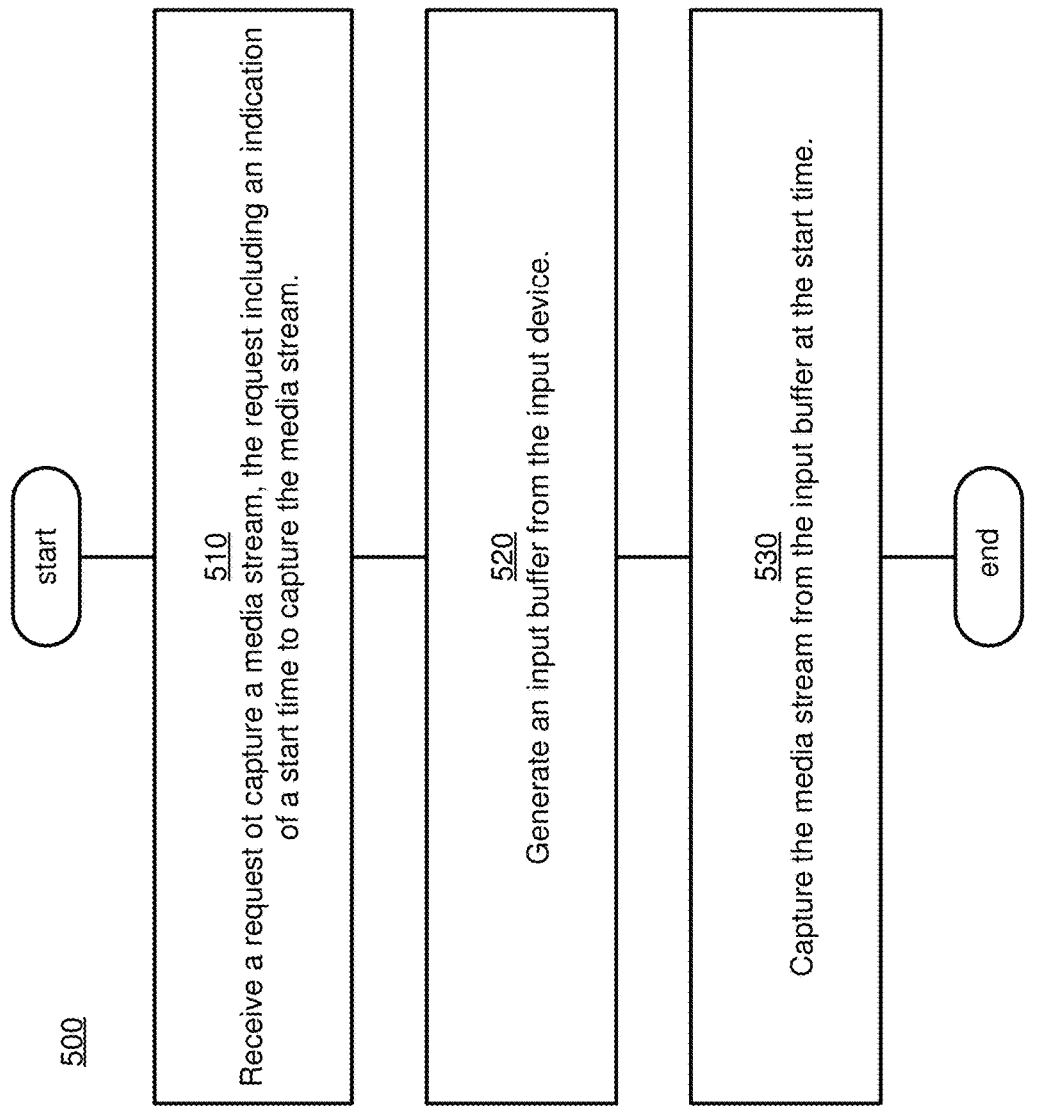
Figure 6:
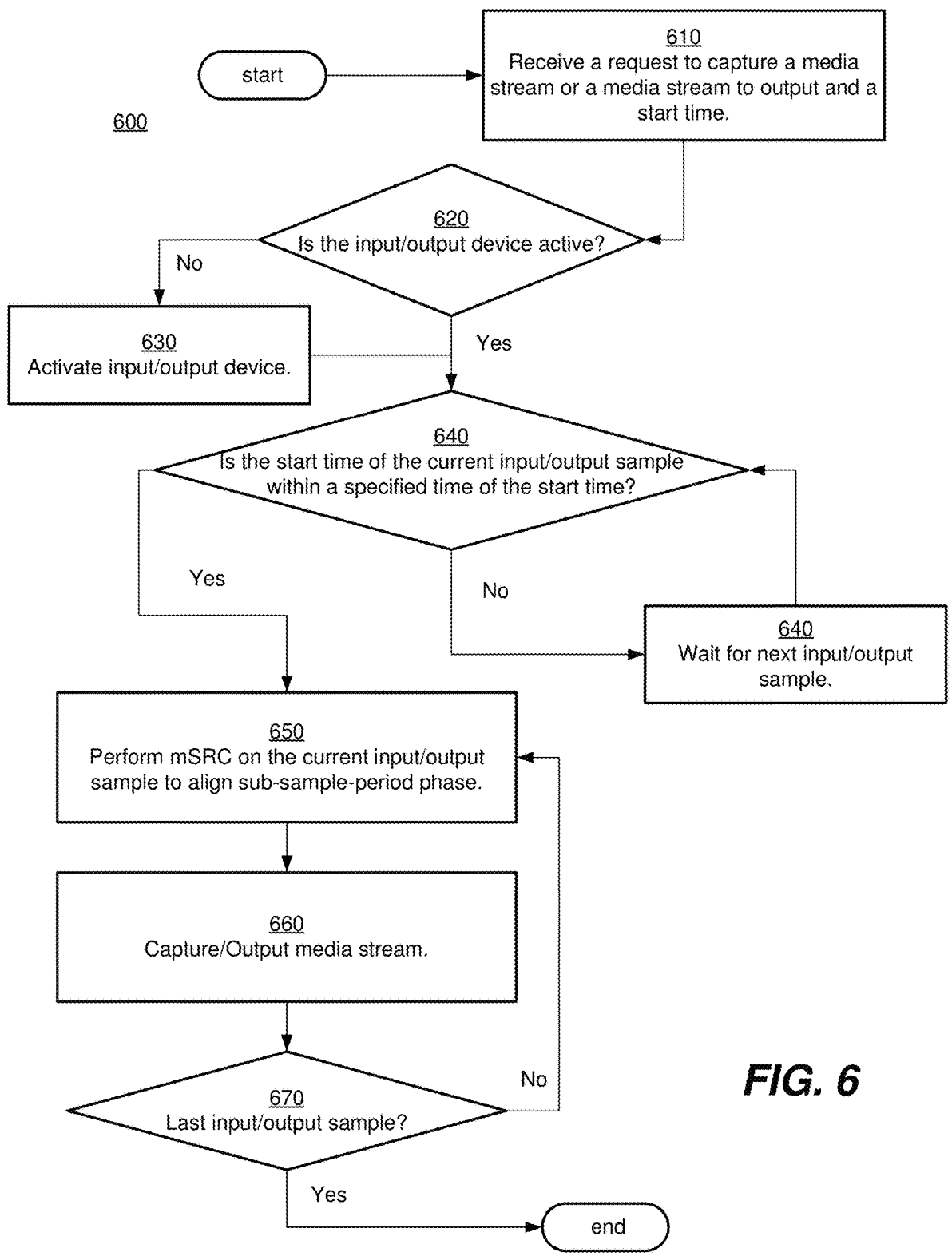

FIGS. 4-6 illustrate example embodiments of logic flows that may be implement by components within the system 1000. The illustrated logic flows may be representative of some or all of the operations executed by one or more embodiments described herein. More specifically, the logic flows may illustrate operations performed by the processor components 110 and/or 210 in executing at least the control routines 132 and/or 232.

In general, FIG. 4 illustrates a logic flow 400 that may be implemented to output a media stream at a particular time as described herein. The logic flow 400 is described with reference to the computing device 100 and FIG. 2. In general, FIG. 5 illustrates a logic flow 500 that may be implemented to capture a media stream at a particular time as described herein. The logic flow 500 is described with reference to the computing device 200 and FIG. 3. In general, FIG. 6 depicts a logic flow 600 that may be implemented to output and/or capture a media stream at a particular time as described herein. The logic flow 600 is described with reference to FIG. 1. However, embodiments are not limited in this context.

Turning more specifically to FIG. 4, the logic flow 400 may begin at block 410. At block 410, a processor component of a computing device of a media stream synchronization system (e.g., the processor component 110 of the computing device 100 of the system 1000) is caused by execution of a media processor to receive a media stream. The media stream including an indication of a start time to output the media stream. For example, the media processor 1321 of the control routine 132 may receive the media stream 133 and the start time 320.

Continuing to block 420, the processor component of the computing device of the media stream synchronization system (e.g., the processor component 110 of the computing device 100 of the system 1000) is caused by execution of a media mixer to mix the media stream into an output buffer at the start time. For example, the media mixer 1323 of the control routine 132 may mix the media stream 133 into the output buffer 135 at the start time 320.

Turning more specifically to FIG. 5, the logic flow 500 may begin at block 510. At block 510, a processor component of a computing device of a media stream synchronization system (e.g., the processor component 210 of the computing device 200 of the system 1000) is caused by execution of a media processor to receive a request to capture a media stream. The request including an indication of a start time to capture the media stream. For example, the media processor 2321 of the control routine 232 may receive the request 239 and the start time 320.

Continuing to block 520, the processor component of the computing device of the media stream synchronization system (e.g., the processor component 210 of the computing device 200 of the system 1000) is caused by execution of a buffer generator to generate an input buffer from an input device. For example, the buffer generator 2322 of the control routine 232 may generate the input buffer 235.

Continuing to block 530, the processor component of the computing device of the media stream synchronization system (e.g., the processor component 210 of the computing device 200 of the system 1000) is caused by execution of a media mixer to capture the media stream from the input buffer at the start time. For example, the media mixer 2323 may capture the media stream 233 from the input buffer 235 at the start time 320.

Turning more specifically to FIG. 6, the logic flow 600 may begin at block 610. At block 610, receive a request to capture a media stream or a media stream to output and a start time, a processor component of a computing device of a media synchronization system (e.g., the processor component 110 and/or 210 of the computing device 100 and/or 200 of the system 1000) is caused by execution of a media processor to receive a request to capture a media stream or a media stream to output and a start time. For example, the media processor 1321 may receive the media stream 133 and the start time 320. As another example, the media processor 2321 may receive the request 239 and the start time 320.

The logic flow 600 may continue to block 620. At block 620, is the input/output device active, the processor component is caused by execution of the media processor to determine whether the input or output device is active. For example, the media processor 1321 may determine whether the output device 180 is active. As another example, the media processor 2321 may determine whether the input device 270 is active.

The logic flow 600 may continue to either block 630 or block 640. At block 630, activate the input/output device, the processor component is caused by execution of the media processor to activate the input or output device based on the determination that the input or output device is not active. For example, the media processor 1321 may activate the output device 180 based on the determination that the output device 180 is not active. As another example, the media processor 2321 may activate the input device 270 based on the determination that the input device 270 is not active. From block 620, the logic flow 600 may continue to block 630.

At block 630, is the current input/output sample within a specified time of the start time, the processor component is caused by execution of a media mixer to determine whether the current sample (e.g., in an input buffer, in an output buffer, or the like) is within a specified time (e.g., +/−half a period, or the like) of the start time. For example, the media mixer 1323 may determine whether the current sample in the output buffer 135 is within a specified time of the start time 320. As another example, the media mixer 2323 may determine whether the current sample in the input buffer 235 is within a specified time of the start time 320.

The logic flow may continue to either block 640 or block 650. At block 640, wait for the next input/output sample, the processor component is caused by execution of the media mixer to wait for the next input or output sample based on the determination that the current samples is not within the specified time of the start time. For example, the media mixer 1323 may wait for the next output sample in the output buffer 135. As another example, the media mixer 2323 may wait for the next input sample in the input buffer 235. After block 640, the logic flow 600 may return to block 630.

At block 650, perform MSRC on the current input/output sample to align sub-sample-period phase, the processor component is caused by execution of the media mixer to perform MSRC on the input or output sample. For example, the media mixer 1323 may perform MSRC on the sample in the output buffer 135 to align the sub-sample-period with the output time stream 137. As another example, the media mixer 2323 may perform MSRC on the sample in the input buffer 235 to align the sub-sample-period with the input time stream 237. It is important to note, that block 650 is optional and may be implemented to provide greater precision in outputting and/or capturing the media stream at the correct time.

The logic flow 600 may continue to block 660. At block 660, capture/output the media stream, the processor component is caused by execution of the media mixer to capture or output the media stream. For example, the media mixer 1323 may mix the media stream 133 into the output buffer 135 to cause the media stream 133 to be output on the output device 180 at the start time. As another example, the media mixer 2323 may capture the current input sample from the input buffer 245 and generate the media stream 233 from the captured input sample.

The logic flow may continue to block 670. At block 670, last input/output sample, the processor component is caused by execution of the media mixer to determine whether the input or output sample is the last sample. For example, the media mixer 1323 may determine whether the current sample in the media stream 133 is the last sample to output. As another example, the media mixer 2323 may determine whether the current sample is the last input sample in the input buffer 235. The logic flow 600 may either return to block 650 or end. For example, the logic flow 600 return to block 650 based on the determination that the input or output sample is not the last sample. Alternatively, the logic flow 600 may end based on the determination that the input or output sample is the last sample.

Figure 7:
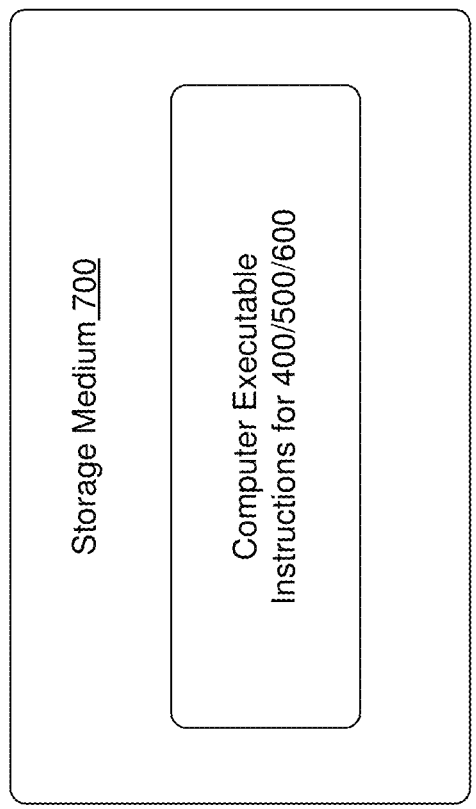
FIG. 7 illustrates a storage medium according to an embodiment.

FIG. 7 illustrates an embodiment of a storage medium 700. The storage medium 700 may comprise an article of manufacture. In some examples, the storage medium 700 may include any non-transitory computer readable medium or machine readable medium, such as an optical, magnetic or semiconductor storage. The storage medium 700 may store various types of computer executable instructions, such as instructions to implement logic flows 400, 500, and/or 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
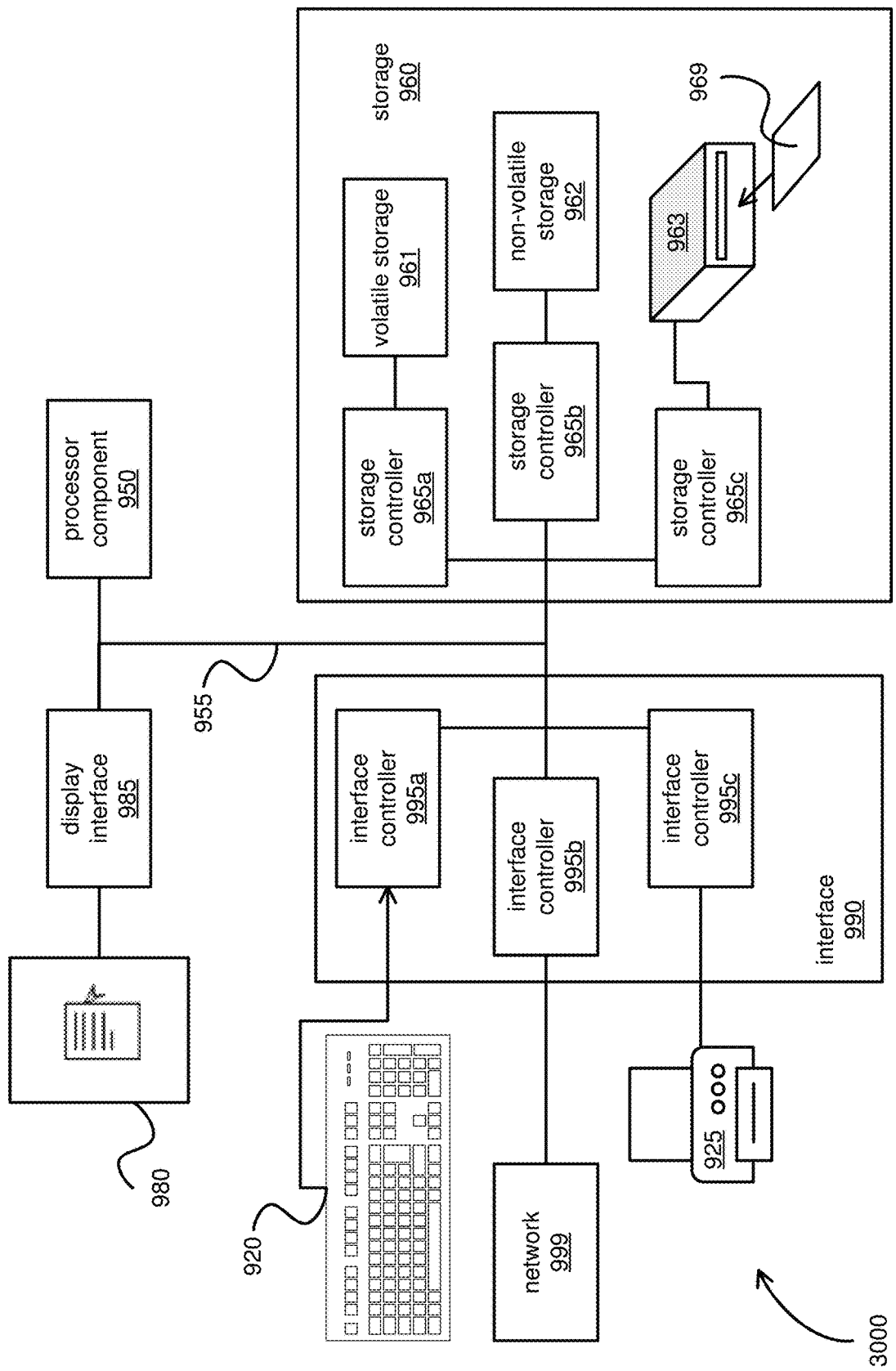
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of the computing device 100 and/or 200.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 110 and/or 210) may include any of a wide variety of commercially available processors, employing any of a wide variety of technologies and implemented with one or more cores physically combined in any of a number of ways.

As previously discussed, the storage 960 (corresponding to the storage 130 and/or 230) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to a storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 160 and/or 260) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, sounds, laser printers, inkjet printers, mechanical robots, milling machines, etc.

Where a computing device is communicatively coupled to (or perhaps, actually incorporates) a display (e.g., the depicted example display 980, corresponding to the display 150 and/or 250), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus for outputting a media stream. The example comprising a media processor to receive a media stream, the media stream including an indication of a start time to output the media stream on an output device; a buffer generator to generate an output buffer for the output device based on the start time and an output stream clock; and a media mixer to mix the media stream into the output buffer at the start time.

Example 2

The apparatus of example 1, wherein the start time is specified in terms of the output stream clock.

Example 3

The apparatus of either of examples 1 to 2, wherein the output stream clock corresponds to a local system time.

Example 4

The apparatus of either of examples 1 to 2, the media processor to receive a global time, wherein the output stream clock corresponds to the global time.

Example 5

The apparatus of either of examples 1 to 2, the media processor to activate the output device and record a time the output device started, wherein the time the output device started is specified in terms of the output stream clock.

Example 6

The apparatus of example 5, the buffer generator to generate the output buffer with a length based at least in part on the start time and the time the output device started.

Example 7

The apparatus of example 6, wherein the media stream is an audio stream and the buffer generator generates the output buffer with silent output.

Example 8

The apparatus of example 6, wherein the media stream is a video stream and the buffer generator generates the output buffer with blank output.

Example 9

The apparatus of example 2, the media mixer to determine whether the start time is within a sample period of the output stream clock, the media mixer to mix the media stream into the output stream buffer based on the determination that the start time is within a sample period of the output stream clock.

Example 10

The apparatus of example 9, the media mixer to perform micro sample rate conversion of the media stream and the output buffer to align the start time with the output stream clock.

Example 11

The apparatus of either of examples 1 to 2, further including a speaker, wherein the media stream is an audio stream and the output device is the speaker.

Example 12

The apparatus of either of examples 1 to 2, further including a display, wherein the media stream is a video stream and the output device is the display.

Example 13

An apparatus for capturing a media stream. The example comprising a media processor to receive a request to capture a media stream, the request including an indication of a start time to capture the media stream from an input device; a buffer generator to generate an input buffer for the input device based on the start time and an input stream clock; and a media mixer to capture the media stream from the input buffer at the start time.

Example 14

The apparatus of example 13, wherein the start time is specified in terms of the input stream clock.

Example 15

The apparatus of either of examples 13 to 14, wherein the input stream clock corresponds to a local system time.

Example 16

The apparatus of either of examples 13 to 14, the media processor to receive a global time, wherein the input stream clock corresponds to the global time.

Example 17

The apparatus of either of examples 13 to 14, the media processor to activate the input device and record a time the input device started, wherein the time the input device started is specified in terms of the input stream clock.

Example 18

The apparatus of either of examples 13 to 14, the media mixer to determine whether the start time is within a sample period of the input stream clock, the media mixer to generate the media stream from the input buffer based on the determination that the start time is within a sample period of the input stream clock.

Example 19

The apparatus of example 18, wherein the input buffer includes a plurality of samples, the media mixer to ignore the samples prior to the start time.

Example 20

The apparatus of example 19, the media mixer to perform micro sample rate conversion on the media stream and the input stream to align the start time with the input stream clock.

Example 21

The apparatus of either of examples 13 to 14, further including a microphone, wherein the media stream is an audio stream and the input device is the microphone.

Example 22

The apparatus of either of examples 13 to 14, further including a camera, wherein the media stream is a video stream and the input device is the camera.

Example 23

A computing-implemented method for outputting a media stream. The computing-implemented method comprising receiving a media stream, the media stream including an indication of a start time to output the media stream on an output device; and mixing the media stream into an output buffer at the start time.

Example 24

The computing-implemented method of example 23, further comprising generating the output buffer for the output device based on the start time and an output stream clock.

Example 25

The computing-implemented method of either of examples 23 to 24, wherein the start time is specified in terms of the output stream clock.

Example 26

The computing-implemented method of either of examples 23 to 24, wherein the output stream clock corresponds to a local system time.

Example 27

The computing-implemented method of either of examples 23 to 24, further comprising receiving a global time, wherein the output stream clock corresponds to the global time.

Example 28

The computing-implemented method of either of examples 23 to 24, further comprising: activating the output device; and recording a time the output device started, wherein the time the output device started is specified in terms of the output stream clock.

Example 29

The computing-implemented method of example 28, further comprising generating the output buffer with a length based at least in part on the start time and the time the output device started.

Example 30

The computing-implemented method of example 29, wherein the media stream is an audio stream, the method further comprising generating the output buffer with silent output.

Example 31

The computing-implemented method of example 29, wherein the media stream is a video stream, the method further comprising generating the output buffer with blank output.

Example 32

The computing-implemented method of example 24, further comprising: determining whether the start time is within a sample period of the output stream clock; and mixing the media stream into the output stream buffer based on the determination that the start time is within the sample period of the output stream clock.

Example 33

The computing-implemented method of example 32, further comprising performing micro sample rate conversion of the media stream and the output buffer to align the start time with the output stream clock.

Example 34

The computing-implemented method of either of examples 23 to 24, wherein the media stream is an audio stream and the output device is the speaker.

Example 35

The computing-implemented method of either of examples 23 to 24, wherein the media stream is a video stream and the output device is the display.

Example 36

A computing-implemented method for capturing a media stream. The computing-implemented method comprising: receiving a request to capture a media stream, the request including an indication of a start time to capture the media stream from an input device; generating an input buffer for the input device based on the start time and an input stream clock; and capturing the media stream from the input buffer at the start time.

Example 37

The computing-implemented method of example 36, wherein the start time is specified in terms of the input stream clock.

Example 38

The computing-implemented method of either of examples 35 to 36, wherein the input stream clock corresponds to a local system time.

Example 39

The computing-implemented method of either of examples 35 to 36, further comprising receiving a global time, wherein the input stream clock corresponds to the global time.

Example 40

The computing-implemented method of either of examples 35 to 36, further comprising: activating the input device; and recording a time the input device started, wherein the time the input device started is specified in terms of the input stream clock.

Example 41

The computing-implemented method of either of examples 35 to 36, further comprising: determining whether the start time is within a sample period of the input stream clock; and generating the media stream from the input buffer based on the determination that the start time is within a sample period of the input stream clock.

Example 42

The computing-implemented method of example 41, wherein the input buffer includes a plurality of samples, the method further comprising ignoring ones of the samples prior to the start time.

Example 43

The computing-implemented method of example 42, further comprising performing micro sample rate conversion on the media stream and the input stream to align the start time with the input stream clock.

Example 44

The computing-implemented method of either of examples 23 to 24, wherein the media stream is an audio stream and the input device is the microphone.

Example 45

The computing-implemented method of either of examples 23 to 24, wherein the media stream is a video stream and the input device is a camera.

Example 46

An apparatus comprising means for performing the method of any of examples 23-45.

Example 47

At least one machine-readable storage medium comprising instructions that when executed by a computing device, cause the computing device to perform the method of any of examples 23-45.

What is claimed is:

1. An apparatus for outputting a media stream comprising:
   a processor; and
   a memory unit coupled to the processor, the memory unit to store a control routine, the control routine operative on the processor to manage outputting of the media stream, the control routine comprising:
      a media processor to receive a media stream, the media stream comprising an indication of a start time, the start time specified in terms of an output stream clock and corresponding to a time to output the media stream on an output device, the media processor to activate the output device and record a time the output device started, wherein the time the output device started is specified in terms of the output stream clock;
      a buffer generator to generate an output buffer for the output device based on the start time and the output stream clock, the buffer generator to generate the output buffer with a length based at least in part on the start time and the time the output device started, the buffer generator configured to generate the output buffer with silent output when the media stream is an audio stream and with blank output when the media stream is a video stream; and
      a media mixer to mix the media stream into the output buffer responsive to the output buffer and the output stream clock being within a specified time of the start time, the media mixer to determine whether the start time is within a sample period of the output stream clock, the media mixer to mix the media stream into the output buffer based on the determination that the start time is within a sample period of the output stream clock, the media mixer to mix the media stream into the output buffer such that the silent or blank output of the output buffer is output to the output device during at least a part of a sample period N, and the media stream is output to the output device during at least a part of a sample period N+1.

2. The apparatus of claim 1, wherein the output stream clock corresponds to a local system time.

3. The apparatus of claim 1, the media processor to receive a global time, wherein the output stream clock corresponds to the global time.

4. The apparatus of claim 1, the media mixer to perform micro sample rate conversion of the media stream and the output buffer to align the start time with the output stream clock.

5. The apparatus of claim 1, further including a speaker, wherein the media stream is an audio stream and the output device is the speaker.

6. The apparatus of claim 1, further including a display, wherein the media stream is a video stream and the output device is the display.

7. An apparatus for capturing a media stream comprising:
a media processor circuit to receive a request to capture a media stream, the request comprising an indication of a start time, the start time specified in terms of an input stream clock and corresponding to a time to capture the media stream from an input device, the media processor circuit to activate the input device and record a time the input device started, wherein the time the input device started is specified in terms of the input stream clock;
a buffer generator circuit to generate an input buffer for the input device based on the start time and the input stream clock, wherein the input buffer is to buffer the media stream from the input device; and
a media mixer circuit to capture the media stream from the input buffer responsive to the input stream clock being within a specified time of the start time, the media mixer circuit to determine whether the start time is within a sample period of the input stream clock, the media mixer circuit to capture the media stream from the input buffer based on the determination that the start time is within a sample period of the input stream clock,
wherein prior to the start time, the input buffer includes one or more samples that are recorded in the input buffer prior to the start time, and
wherein the media mixer is to ignore the one or more samples in the input buffer between (i) the time the input device started and (ii) the start time.

8. The apparatus of claim 7, wherein the time the input device started is specified in terms of the input stream clock.

9. A computing-implemented method for outputting a media stream comprising:
receiving, by a media processor, a media stream, the media stream comprising an indication of a start time, the start time specified in terms of an output stream clock and corresponding to a time to output the media stream on an output device;
activating, by the media processor, the output device;
recording, by the media processor, a time the output device started, wherein the time the output device started is specified in terms of the output stream clock;
generating, by a buffer generator, an output buffer for the output device based on the start time and the output stream clock, the output buffer being generated with a length based at least in part on the start time and the time the output device started, wherein the output buffer is generated with silent output when the media stream is an audio stream and with blank output when the media stream is a video stream;
mixing, by a media mixer, the media stream into the output buffer responsive to the output buffer and the output stream clock being within a specified time of the start time;
determining whether the start time is within a sample period of the output stream clock;
mixing, by the media mixer, the media stream into the output stream buffer based on the determination that the start time is within the sample period of the output stream clock;
outputting, by the media mixer, the silent or blank output of the output buffer to the output device during at least a part of a sample period N; and
outputting, by the media mixer, the media stream to the output device during at least a part of a sample period N+1.

10. At least one non-transitory machine-readable storage medium comprising instructions that when executed by a computing device, cause the computing device to:
receive a request to capture a media stream, the request comprising an indication of a start time, the start time specified in terms of an input stream clock and corresponding to a time to capture the media stream from an input device;
activate the input device and record a time the input device started, wherein the time the input device started is specified in terms of the input stream clock;
generate an input buffer for the input device based on the start time and the input stream clock, wherein the input buffer is to buffer the media stream from the input device;
determine whether the start time is within a sample period of the input stream clock;
capture, using a media, mixer, the media stream from the input buffer based on the determination that the start time is within a sample period of the input stream clock;
record, in the input buffer, one or more samples prior to the start time; and
wherein the media mixer is to ignore the one or more samples in the input buffer between (i) the time the input device started and (ii) the start time.

* * * * *